United States Patent [19]
Kohus

[11] Patent Number: 5,239,770
[45] Date of Patent: Aug. 31, 1993

[54] QUICK ON AND OFF FISHING SINKER

[76] Inventor: Louis M. Kohus, 1312 Mayland Dr., Cincinnati, Ohio 45230

[21] Appl. No.: 833,353

[22] Filed: Feb. 10, 1992

[51] Int. Cl.$^5$ .............................................. A01K 95/00
[52] U.S. Cl. ................. 43/44.91; 43/44.89; 43/44.87
[58] Field of Search ................ 43/44.91, 44.83, 44.87, 43/44.89, 44.93

[56] References Cited

U.S. PATENT DOCUMENTS

| | | | |
|---|---|---|---|
| 2,459,287 | 1/1949 | Robbins | 43/44.89 |
| 2,599,973 | 6/1952 | Bujaky | 43/44.91 |
| 2,733,538 | 2/1956 | Alimas | 43/44.89 |
| 2,904,924 | 9/1959 | Tashiro | 43/44.89 |
| 3,019,545 | 2/1962 | Long | 43/44.89 |
| 3,037,318 | 6/1962 | Schultz | 43/44.87 |
| 4,649,664 | 3/1987 | Mahan | 43/44.83 |
| 4,891,903 | 1/1990 | Wymore | 43/44.89 |

FOREIGN PATENT DOCUMENTS

| | | | |
|---|---|---|---|
| 456284 | 5/1949 | Canada | 43/44.91 |
| 1012491 | 7/1957 | Fed. Rep. of Germany | 43/44.91 |
| 1152573 | 8/1983 | Fed. Rep. of Germany | 43/44.91 |
| 2155743 | 10/1985 | United Kingdom | 43/44.87 |

Primary Examiner—Kurt C. Rowan
Attorney, Agent, or Firm—Barbara Joan Haushalter

[57] ABSTRACT

A fishing implement has a generally elongated, substantially cylindrical body with at least one substantially axial slot and at least one or a series of interconnecting substantially radial slots extending along its length. The slots generally alternate from axial to radial along the length of the body, with each slot extending approximately to the longitudinal axis of the body. The alternating axial and radial slots form a circuitous passageway for readily threading a fishing implement to a fishing line in a fixed position and easily removing it thereafter, while the terminus wall of the axial slot or slots form a central straight passageway through the implement so that the fishing sinker is also capable of free sliding movement along the fishing line.

19 Claims, 6 Drawing Sheets

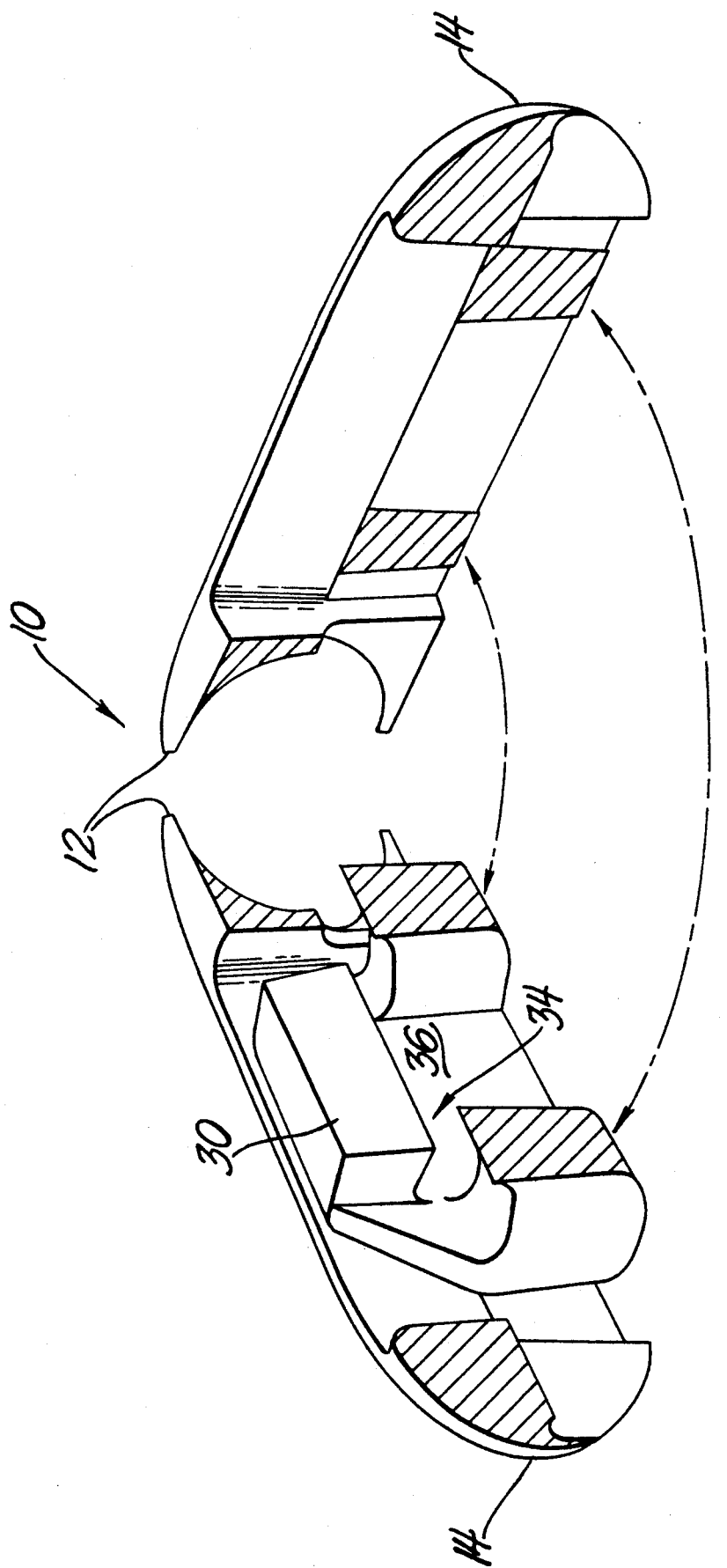

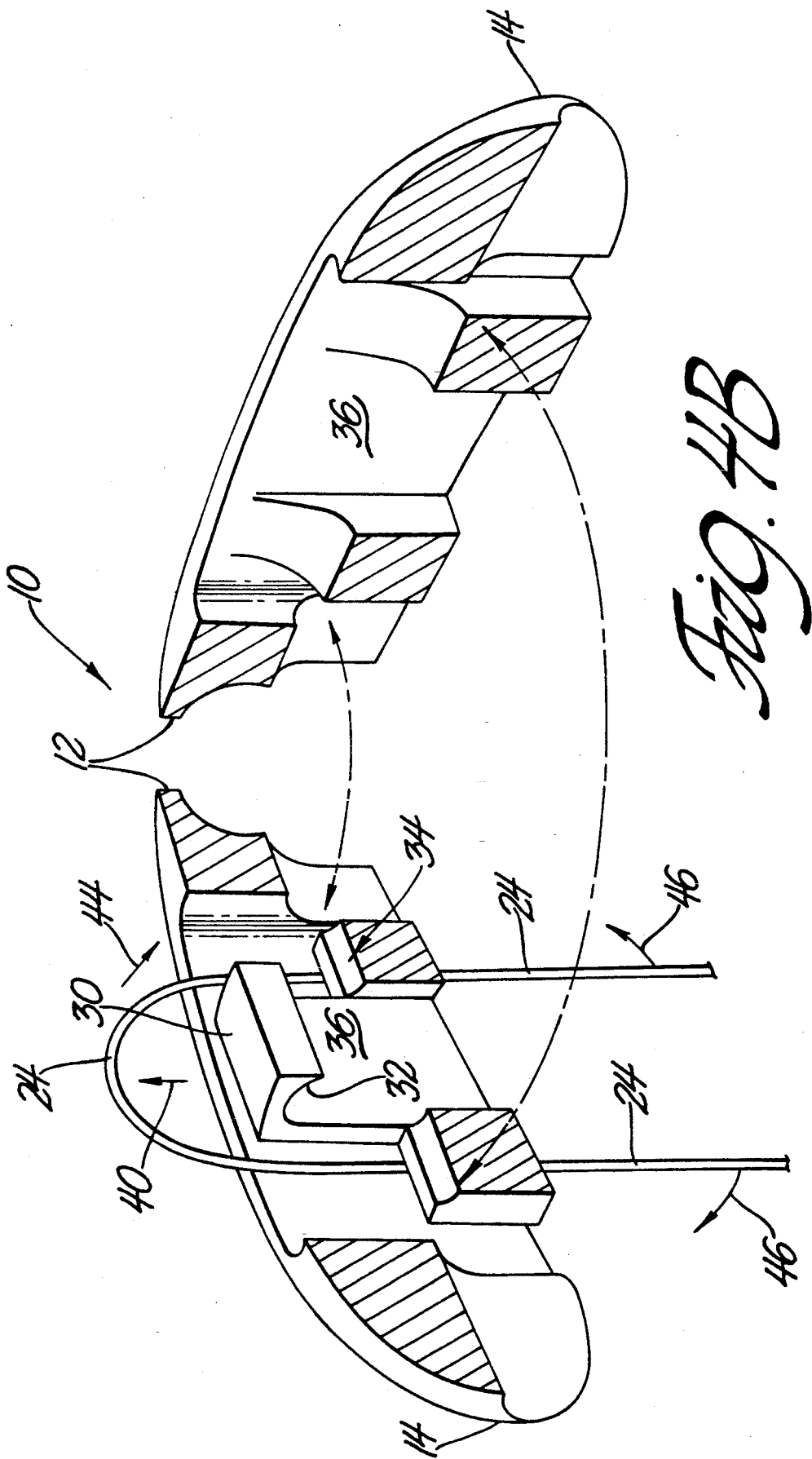

QUICK ON AND OFF FISHING SINKER

BACKGROUND OF THE INVENTION

The present invention relates to fishing line implements and, more particularly, to fishing sinkers which are capable of being readily threaded and removed from the fishing line.

Fishing is an outdoor sport enjoyed by young and old. The basic equipment for sport fishing include a barbed hook to hook the fish and a fishing line attached to the hook to pull the hooked fish to the fisherman. Various fishing tackle components, dependent on the type of fishing being undertaken, include rods, reels, floats, sinker weights, artificial bait, and beads. Auxiliary components such as pole props and rubber band line stop segments tied onto the fishing line have also become popular with anglers.

Fishing tackle components are important to anglers for the function each component performs. For example, anglers use fishing sinkers to add weight to a fishing line and control the depth of the hook at the end of the line. Other fishing implements such as beads, which are light weight and have a hole through the longitudinal center, are also threaded to fishing lines for various purposes. Depending on the application and the fishing style, the angler will use sinkers and beads which are either in a sliding position or a fixed position. For example, for float fishing, a fishing sinker is attached to the fishing line near the fish hook. It is used to ensure that a baited fish hook drops to the depth where it is believed that fish are feeding. A bead is often used in the sliding position for slip float fishing. A line stop and the bead can prevent the float from sliding along the line beyond the line stop system. This, in effect fixes the depth of fishing, but does not limit reel-in.

A variety of fishing implements, including sinkers, are available in the market. Commercially available sinkers typically have an eyelet or hole through which the fishing line passes. Existing worm or bullet weights, with the eyelet or hole, can be used when an angler desires a sliding position for artificial lure fishing, such as is used in Texas or Carolina rig style fishing. With the sliding sinker style, the fishing line is inserted through the eyelet or hole and the sinker moves freely along the line in a sliding position. If an angler prefers a fixed position sinker, such as for float or bobber fishing, knots are tied in the line or on the line with a suitable material, to fix the position of the sinker. Unfortunately, knots are time-consuming and they kink the line. Additionally, when the angler wishes to switch to a different style or size sinker, the line must be cut and a new sinker retied.

In an effort to overcome the problems associated with tying knots in or on the fishing line, one type of existing sinker has a strip of rubber extending through the center of the sinker and outward from the top to the bottom. When the fishing line has been inserted in this sinker and positioned along the line, the extending rubber ends are twisted in a secondary step to secure and fix the position of the sinker. While this eliminates the problem of having to cut the line to change the sinker, the sinker can only be attached to the line in a fixed position. Additionally, this type of fixed sinker is very expensive.

Alternatively, some sinkers have a fishing line-receiving slot which can be closed with extending tabs to trap the line. The fishing line is inserted in the slot and the sinker is positioned along the line. A secondary step then requires that the tabs be folded over the line to hold the sinker to the line. An advantage of this style sinker is that, depending on how tight the tabs are folded, the sinker may be positioned in a sliding or a fixed position. However, the tabs have a tendency to break off, requiring frequent replacement of the sinker.

An annoying problem with all of these fishing sinkers, and with other line-threaded fishing implements, is the difficulty in positioning them on a fishing line. Whether threading the line through an eyelet or a hole, twisting strips of rubber to fix the position of the sinker, or pinching closed an open-sided slot, a degree of patience and time is needed, taking away from the time that the angler can spend actually fishing.

It is seen then that there exists a need for fishing implements which overcome the problems associated with existing implements, such as sinkers, and can be used in a sliding position or a fixed position, particularly ones which can be easily connected and disconnected from the fishing line. Such implements must be economical to produce and easy to use.

SUMMARY OF THE INVENTION

This need is met by the fishing implement, described in reference to a sinker, according to the present invention, wherein a quick-on, quick-off routing design provides rigging flexibility and more time for fishing. The fishing sinker of the present invention has a generally elongated, substantially cylindrical body with at least one substantially axial slot and at least one or a series of interconnecting substantially radial slots extending along its length. The slots generally alternate from axial to radial along the length of the body, with each slot extending approximately to the longitudinal axis of the body. The alternating axial and radial slots form a circuitous passageway for readily threading a fishing sinker to a fishing line in a fixed position and easily removing it thereafter. While the terminus wall of the axial slot or slots form a central straight passageway through the sinker so that the fishing sinker is also capable of free sliding movement along the fishing line.

In accordance with one aspect of the present invention, an easy thread fishing sinker comprises a generally elongated body having a first end and a second end, with a middle portion situated between the ends. The middle portion has a first side and a second side, with the first and second sides divided along an approximate longitudinal axis of the body. The sinker also comprises a line receiving aperture extending through the first and second sides for receiving a fishing line. Finally, the sinker comprises a slotted section defined in the first side and capable of maintaining the fishing sinker in either a fixed position or a sliding position along the line. A perimeter of the slotted section is defined by the line receiving aperture and a line retaining aperture.

Accordingly, it is an object of the present invention to provide quick connect/disconnect fishing implements, including sinkers. It is a further object to provide such implements which can be rigged in both sliding and/or fixed positions without cutting or tying the fishing line. It is an advantage of the present invention that a secondary step, such as a squeezing or pinching step, is not required to attach the implement to the fishing line. Finally, it is a feature of the invention to provide an integral fishing implement which is economical to produce.

BRIEF DESCRIPTION OF THE DRAWINGS

FIGS. 4A, 4B, and 4C are longitudinal views of the fishing sinker of FIG. 1 taken along line 4—4;

DETAILED DESCRIPTION OF THE PREFERRED EMBODIMENTS

Figure 1:
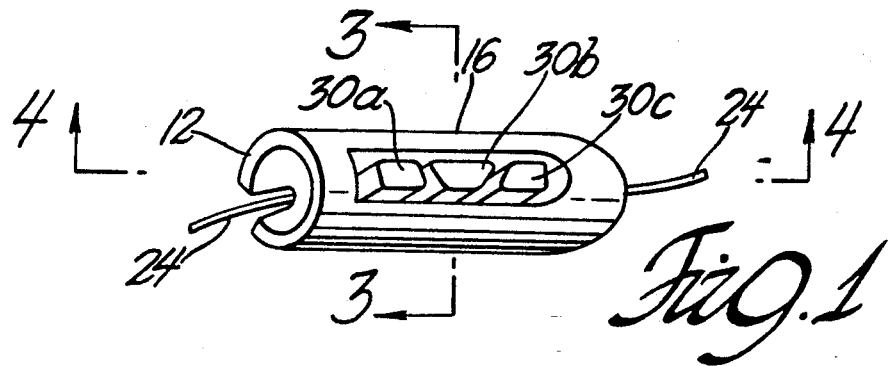
FIG. 1 is a perspective view of the fishing sinker of the present invention.
Figure 2:
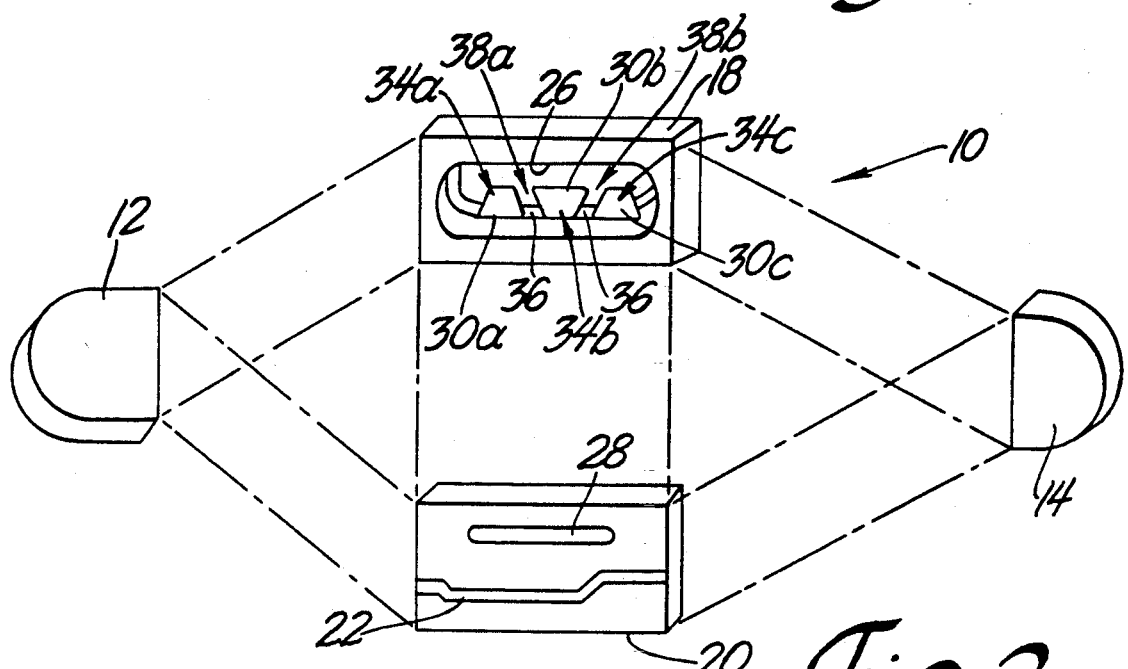
FIG. 2 is an exploded view of the fishing sinker of FIG. 1, but having an alternative shape, and illustrating the portions comprising the fishing sinker of the present invention.

The quick on and off concept for fishing implements of the present invention may be applied to a wide variety of fishing implements, including sinkers and beads. For descriptive purposes, however, the quick on and off concept of the present invention will be described in reference to a fishing sinker. The fishing sinker of the present invention may be of any shape suitable for fishing sinkers generally, including but not limited to a worm weight sinker shape as illustrated in FIG. 1, a torpedo sinker shape as illustrated in FIG. 2, a bullet sinker shape, an egg sinker shape, a bass casting sinker shape, or a walking walleye sinker shape. Fishing sinkers are generally made of a heavy or high density material such as lead or other metal in order to serve as weights for the fishing line. The ends of the sinker may be conical, concaved, domed, or any other suitable shape, depending on the purpose to be served by the sinker. Obviously, for other fishing implements employing the concept of the present invention, the material may be plastic or polypropylene, as suits the purpose of the implement.

In the present invention, a fishing sinker typically has a generally elongated, substantially cylindrical body with at least one substantially axial slot and, in a preferred embodiment, a series of interconnecting substantially radial slots extending along its length. The slots generally alternate from axial to radial along the length of the body, with each slot extending approximately to the longitudinal axis of the body. The alternating axial and radial slots form a circuitous passageway for readily threading a fishing sinker to a fishing line in a fixed position and easily removing it thereafter. The terminus wall of the axial slot or slots form a central straight passageway through the sinker so that the fishing sinker is also capable of free sliding movement on the fishing line.

Figure 5A:
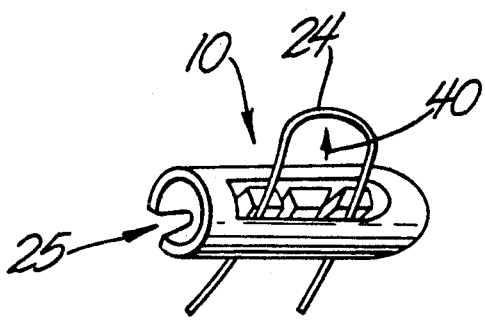
FIGS. 5A, 5B, 5C, and 5D illustrate one sequence for threading a fishing line into the fishing sinker of FIG. 1 in either a sliding position of FIG. 5C or a fixed position of FIG. 5D.
Figure 5B:
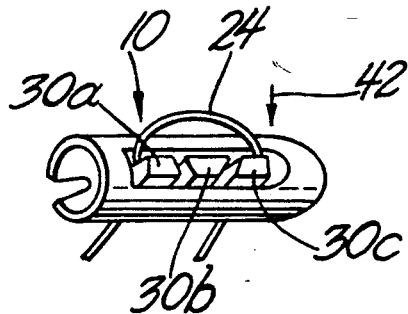

Referring now to the drawings, in FIG. 1 there is illustrated an easy thread fishing sinker 10. The fishing sinker 10 has a generally elongated body having a first end 12 and a second end 14. A middle portion 16, situated between the first and second ends 12 and 14, has a first or top side 18 and a second or bottom side 20, as illustrated in FIG. 2. The first and second sides 18 and 20 are divided along an approximate longitudinal axis 4—4 of the body of the sinker 10. A line receiving aperture 22 extends through the first side 18 and the second side 20 for receiving a fishing line 24. The fishing line 24 extends through the sinker 10 via a line receiving opening 25, located at each end 12 and 14 of the sinker 10, as best illustrated in FIG. 5A. A slotted section 26 defined in the first side 18 and extending through the first side 18 approximately to the longitudinal axis, is capable of maintaining the fishing sinker 10 in either a fixed position or a sliding position along the fishing line 24. A perimeter of the slotted section 26 is defined by the line receiving aperture 22 and also by an optional line retaining aperture 28. The line retaining aperture 28 extends through the first side 18 of the longitudinal axis of the sinker 10.

Figure 4C:
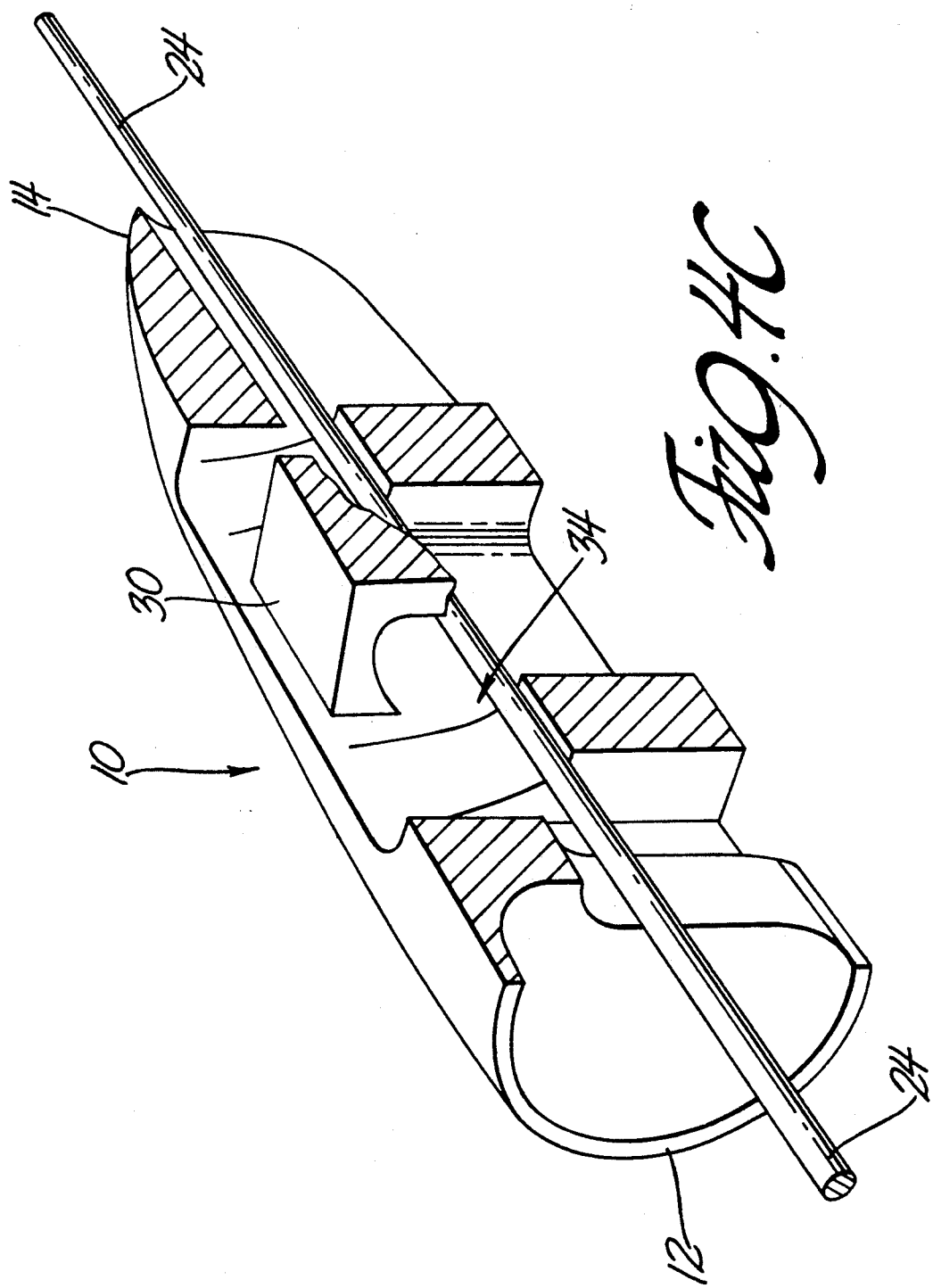

The slotted section includes at least one solid line retaining extension 30, and preferably three solid line retaining extensions 30a, 30b, and 30c, extending upwardly through the first side 18. The slotted section 26 has at least one axial slot 34, as best illustrated in FIGS. 4A-4C, and preferably three axial slots 34a, 34b, and 34c, formed under the line retaining extensions 30a, 30b, and 30c, respectively. The number of axial slots 34 typically corresponds to the number of line retaining extensions 30. The fishing line 24 is received by the one or more axial slots 34 and retained against a terminus wall 36 of the axial slot or slots 34, which forms a straight passageway through the sinker 10. The terminus wall 36 extends lengthwise along an approximate longitudinal axis 4—4 of the sinker 10. The fishing line 24, therefore, can abut the terminus wall 36, allowing the sinker 10 to have free sliding movement through the straight passageway along the line 24.

A notch 32 may be formed at the bottom side of the line retaining extensions 30 for increased line retention capability. The notch 32 would be formed at corner 33 of FIG. 3, to curl slightly over the axial slot 34, as illustrated in FIG. 4B. Additionally, the fishing sinker 10 may also include two radial slots 38a and 38b. The radial slots 38a and 38b terminate at a plane formed by the axial slots 34, as shown in FIGS. 1 and 2, wherein each radial slot is substantially perpendicular to the plane of each axial slot. The axial slots 34a, 34b, and 34c, alternate with the radial slots 38a and 38b, and all of the slots are dimensioned to accommodate at least the dimension of a fishing line. Hence, multiple radial slots are interconnected via the axial slots 34 and the terminus wall 36. The number of radial slots is typically related to the number of axial slots plus one. That is, if there are n radial slots, there are n+1 axial slots, where n is zero, or an integer of from one to ten, and preferably an integer of from two to four.

Figure 5C:
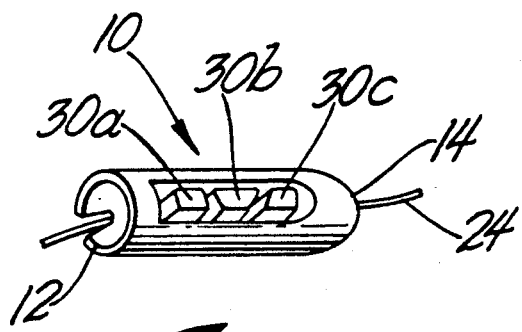

For purposes of description, in FIGS. 4A through 4C, n equals zero, so there is one axial slot 34 and zero radial slots. This design is particularly adaptable for sliding or slipping sinker position fishing, since the sinker 10 can slide freely along the line 24, as the line 24 is retained in the straight passageway, as illustrated in FIG. 4C. FIGS. 4B, 4C, and 5A through 5D, illustrate a sequence for threading the fishing line 24 into the fishing sinker 10. The sequence of steps shown in FIGS. 5A through 5C results in the line 24 being threaded so as to abut the terminus wall 36. The terminus wall 36 forms a straight passageway, allowing the sinker 10 to move freely along the line 24 in a slipping or sliding position, as shown in FIGS. 4C and 5C.

Figure 3:
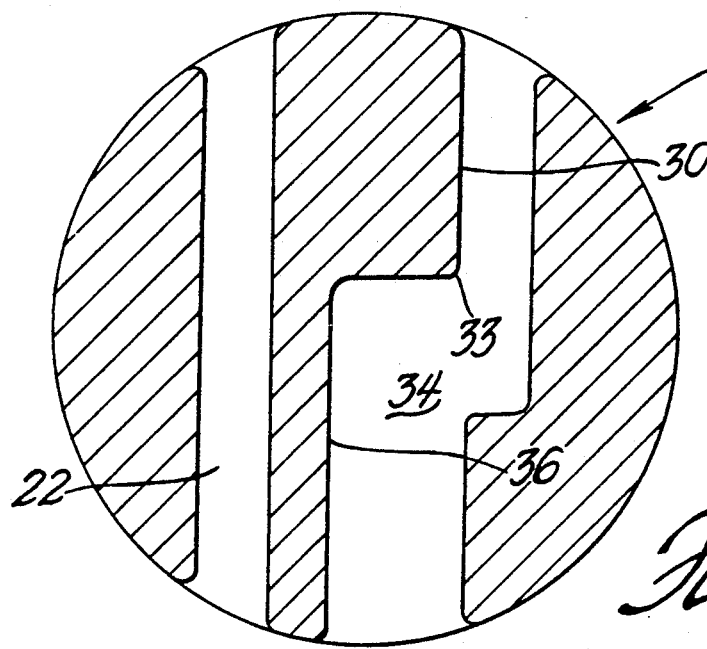
FIG. 3 is a view of the fishing sinker of FIG. 1 taken along line 3—3.

As shown in FIGS. 4B and 5A, the fishing line 24 is looped and inserted upward, as indicated by arrow 40, into the line receiving aperture 22 of FIGS. 2 and 3. The line 24 is then pushed down over the one or more line retaining extensions 30a, 30b, and 30c, as indicated by arrow 42 in FIG. 5B. In FIG. 4B, the looped line 24 would be brought forward as indicated by arrow 44 and inserted under the line retaining extension 30. The ends of the line 24 may then be pulled up in the direction of arrow 46 of FIG. 4B, pulled taut into the free sliding passageway created by the terminus wall 36, and pulled through the ends 12 and 14, as illustrated in FIGS. 4C and 5C. The sinker 10 may then freely slip or slide along the line 24.

Figure 5D:
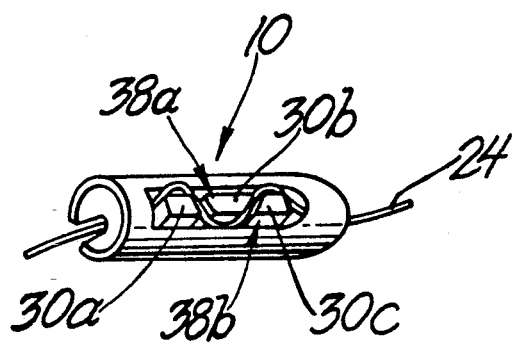

Referring now to FIG. 5D, with multiple radial and axial slots a circuitous passageway is formed in the slotted section 26. The line 24 may be detoured and manipulated along the circuitous passageway, between the line retaining extensions 30a, 30b, and 30c, and along the radial slots 38a and 38b. In between the radial slots 38a and 38b, the line is slipped under the line retaining extensions 30a, 30b, and 30c, and into the axial slots 34a, 34b, and 34c. Hence, the fishing line 24 is threaded through the circuitous passageway to maintain the fishing sinker 10 in a fixed position along the line 24. There are numerous ways of threading the line 24 into the sinker 10 which have satisfactory results. It is to be clearly understood that FIGS. 4B, 4C, and 5A through 5D illustrate only one of many threading techniques and are not to be considered as limiting the scope of the invention.

Figure 6:
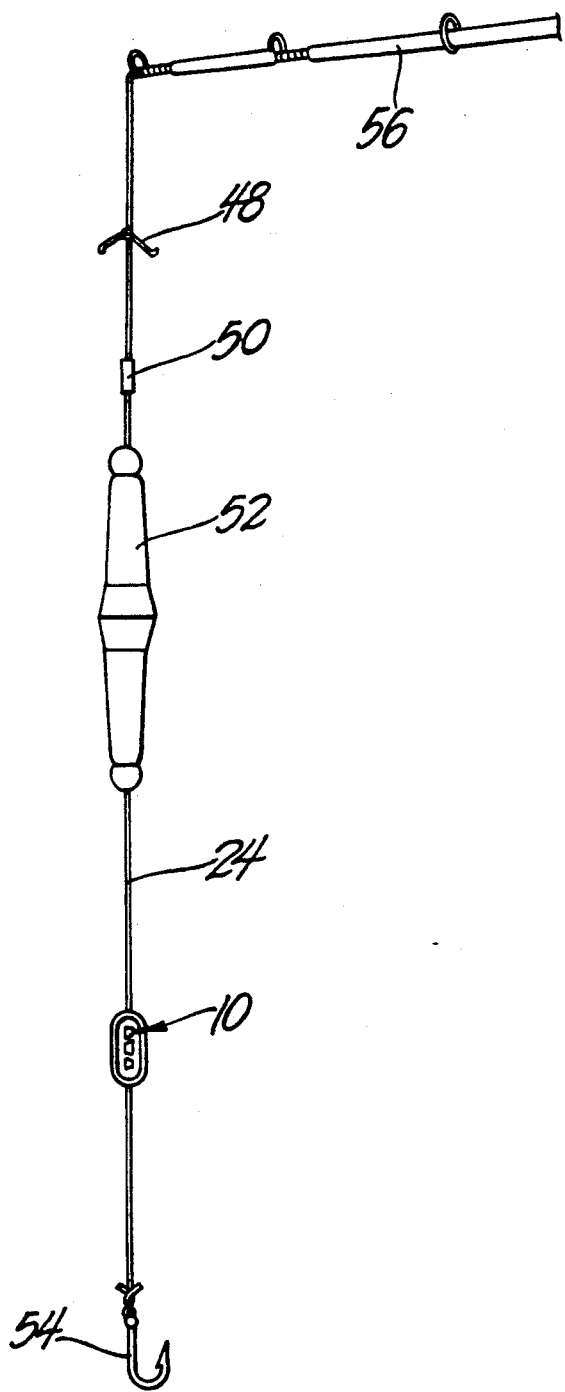
FIG. 6 is an illustration of a live bait fishing rig using the fishing sinker of the present invention.
Figure 7:
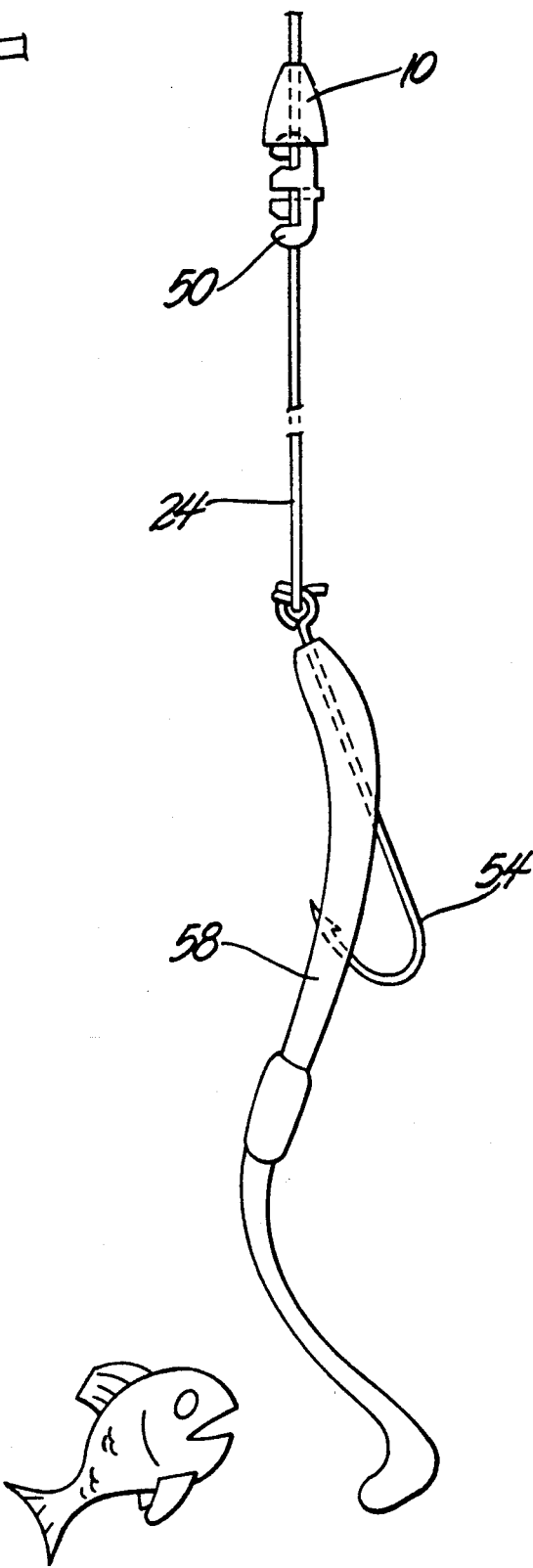
FIG. 7 is an illustration of a Carolina rig fishing system which can employ the fishing sinker of the present invention.

Two uses of the fishing line sinker 10 and other implements are shown in FIGS. 6 and 7. In FIG. 6, the use of the fishing sinker 10 in a live bait fishing rig is shown. The fishing line 24 has a rubber band segment line stop 48, a bead 50, a float 52, the sinker 10, and a hook 54, all attached to a fishing pole 56. In use, the bead 50 and the floater 52 float on the water after the angler casts his or her line 24. The sinker 10 weights down the portion of the line 24 which is under water, to keep the hook 54 under water where it can attract fish. The sinker 10 can be threaded onto the line 24 in either a sliding or fixed position. Additionally, when the angler wants to change the sinker 10 from a fixed to a sliding position, or vice versa, or to change the location of the fixed sinker 10, he or she can simply unthread and rethread the sinker, without cutting the line 24.

In FIG. 7, a Carolina rig fishing system is shown. A fishing line 24 has a buoyant artificial worm 58 on the hook 54. The bead 50 and a bullet-shaped worm weight sinker 10 are threaded onto the line 24. The bead 50 is a fishing line implement that can employ the concept of the present invention. The bead 50 is preferably made from polypropylene and the line 24 is threaded into it, in a fixed position in FIG. 7. The worm weight sinker 10 can also employ the concept of the present invention and is threaded to the line 24, in a sliding or slip position in FIG. 7. In use, the system is dragged along the bottom of a lake or some other body of water. The lake bottom is stirred up with the artificial worm 58 and hook 54 is held off the lake bottom due to buoyancy. The bead 50 keeps the sinker 10 a sufficient distance from the hook 54 to prevent any kind of interference.

The present invention is an integral fishing implement, such as a sinker, which is readily threaded to and removed from a fishing line. The implement may be attached to the fishing line in either a sliding or a fixed position, without requiring a secondary step to fix the position of the implement to the line. Although the fishing implement is shown as a sinker having a generally elongated cylindrical-shaped body or a bullet shaped body, other implements may also employ the concept of the present invention. Additionally, the sinkers or other implements may have varying body shapes including but not limited to rectangular, conical, egg, torpedo, bass casting, worm weights, walking walleye, etc. with flat, domed, concaved, dimpled, etc. ends, without departing from the scope of the invention. The fishing implement or sinker can be made with a varying number of alternating slots than those illustrated in the drawings. Implements with additional slots, however, may provide diminishing benefits in that they take longer to connect and disconnect. Finally, the slots may be inwardly or outwardly tapered, beveled, notched, chamfered, or substantially parallel.

Having described the invention in detail and by reference to preferred embodiments thereof, it will be apparent that other modifications and variations are possible without departing from the scope of the invention defined in the appended claims.

What is claimed is:

1. An easy thread fishing implement comprising:
 a generally elongated body having a first end and a second end;
 a middle portion situated between said first end and said second end, said middle portion having a first side and a second side, said first and second sides divided along an approximate longitudinal axis of said body;
 a line receiving aperture extending through said first side and said second side for receiving a fishing line; and
 a slotted section defined in said first side capable of maintaining said fishing implement in a fixed position and a sliding position along said fishing line, a perimeter of said slotted section defined by said line receiving aperture and a line retaining aperture.

2. A fishing implement as claimed in claim 1 wherein said first end and said second end each comprise a line receiving opening.

3. A fishing implement as claimed in claim 1 wherein said first end is conical and said second end is concave.

4. A fishing implement as claimed in claim 1 wherein said first end and said second end are domed.

5. A fishing implement as claimed in claim 1 wherein said slotted section extends into said first side of said body to said approximate longitudinal axis of said body.

6. A fishing implement as claimed in claim 1 wherein said slotted section comprises at least one axial slot for receiving said fishing line and retaining said fishing line against a terminus wall, wherein said terminus wall forms a straight passageway through said implement so that said fishing line abuts said terminus wall, allowing said implement to be capable of free sliding movement along said line.

7. A fishing implement as claimed in claim 6 wherein said slotted section further comprises at least one radial slot for forming a circuitous passageway through which said fishing line is capable of being readily threaded.

8. A fishing implement as claimed in claim 7 wherein said at least one radial slot terminates at a plane formed by said at least one axial slot.

9. A fishing implement as claimed in claim 1 wherein said slotted section comprises n radial slots and n+1 axial slots, wherein n is zero.

10. A fishing implement as claimed in claim 1 wherein said slotted section comprises n radial slots and n+1 axial slots, wherein n is an integer of from one to ten.

11. A fishing implement as claimed in claim 10 wherein n is an integer of from two to four.

12. A fishing implement as claimed in claim 7 wherein said at least one radial slot comprises a first radial slot and a second radial slot, said first and second radial slots being interconnecting.

13. A fishing implement as claimed in claim 7 wherein said at least one axial slot forms a notch at a bottom side of said at least one radial slot for increased line retention capability.

14. A fishing implement as claimed in claim 1 wherein said line retaining aperture extends through said first side to said longitudinal axis.

15. An easy thread fishing implement comprising:
a generally elongated body having a first end and a second end;
a middle portion situated between said first end and said second end, said middle portion having a first side and a second side, said first and second sides divided along an approximate longitudinal axis of said body;
a line receiving aperture extending through said first side and said second side for receiving a fishing line; and
a slotted section defined in said first side capable of allowing said fishing implement to be in a sliding position along said fishing line, a perimeter of said slotted section defined by said line receiving aperture and a line retaining aperture, said slotted section having at least one axial slot.

16. A fishing implement as claimed in claim 15 wherein said at least one axial slot is capable of receiving said fishing line and retaining said fishing line against a terminus wall, wherein said terminus wall forms a straight passageway through said implement so that said fishing line abuts said terminus wall, allowing said implement to be capable of free sliding movement along said line.

17. An easy thread fishing implement comprising:
a generally elongated body having a first end and a second end;
a middle portion situated between said first end and said second end, said middle portion having a first side and a second side, said first and second sides divided along an approximate longitudinal axis of said body;
a line receiving aperture extending through said first side and said second side for receiving a fishing line; and
a slotted section defined in said first side capable of holding said fishing implement in a fixed position on said fishing line, a perimeter of said slotted section defined by said line receiving aperture and a line retaining aperture, said slotted section having at least one axial slot and further having at least one radial slot.

18. A fishing implement as claimed in claim 17 wherein said slotted section comprises:
first, second, and third axial slots for receiving said fishing line and retaining said fishing line against collective terminus walls; and
first and second radial slots, wherein said first, second, and third axial slots and said first and second radial slots alternate from axial to radial along a length of said body.

19. A fishing implement as claimed in claim 18 wherein said alternating axial and radial slots form a circuitous passageway through said implement so that said implement remains in a fixed position along said fishing line.

* * * * *